Figure 1:
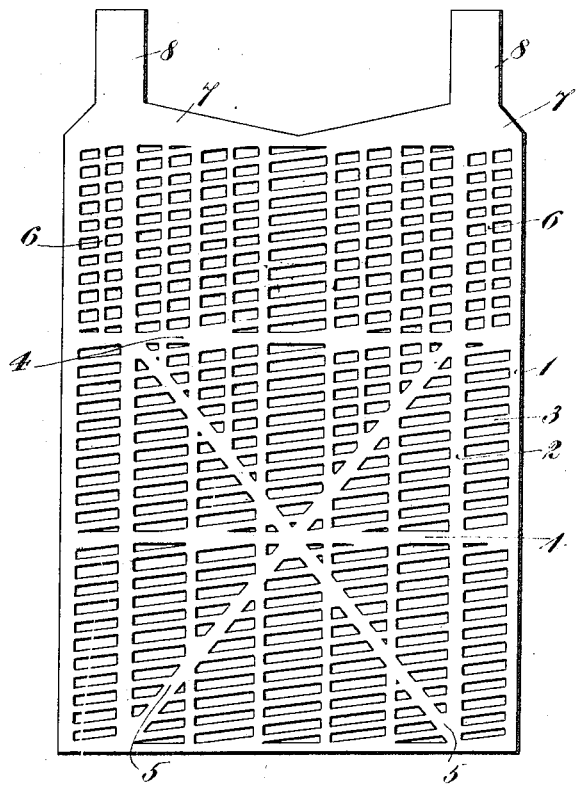

W. A. PRINCE.
STORAGE BATTERY.
APPLICATION FILED FEB. 4, 1913.

1,069,809.

Patented Aug. 12, 1913.

WITNESSES:
Patrick J. Conroy
E. B. Tomlinson

INVENTOR:
Wallace A. Prince
by Browne & Woodworth
attys.

UNITED STATES PATENT OFFICE.

WALLACE A. PRINCE, OF QUINCY, MASSACHUSETTS, ASSIGNOR TO JOSEPH C. KENT, TRUSTEE, OF CAMBRIDGE, MASSACHUSETTS.

STORAGE BATTERY.

1,069,809.

Specification of Letters Patent. Patented Aug. 12, 1913.

Application filed February 4, 1913. Serial No. 746,118.

*To all whom it may concern:*

Be it known that I, WALLACE A. PRINCE, a citizen of the United States, and a resident of Quincy, in the county of Norfolk and State of Massachusetts, have invented a new and useful Improvement in Storage Batteries, of which the following is a specification.

My invention relates to storage batteries of the pasted-grid type and its object is to improve the same in the manner hereinafter set forth.

Automobile storage batteries used in connection with electric self-starters are subject to heavy momentary discharges with the result that the heavy drafts of current cause premature deterioration of that portion of the grid adjacent to the lug, such deterioration being effected by the lead peroxid which attacks the antimony of the antimony-lead compound employed in grids and leaves the grid porous in the vicinity of the lug.

In order to overcome this defect, I provide the positive grid with two lugs arranged at opposite corners of the frame and provide extra conducting ribs extending downwardly from the lugs toward cross-ribs, the effect of this construction being to equalize the current density in the various portions of the grid.

My invention also comprises various other features of construction hereinafter more fully described and claimed.

My invention will be described in connection with the drawings which accompany and form a part of this specification and illustrate one embodiment thereof which has been found to give good results in practice; although it will be understood that I do not limit myself to the exact structure shown, inasmuch as the same may be widely varied without departing from the principle of my invention.

Figure 2:
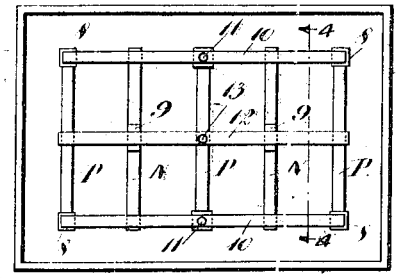
Figure 3:
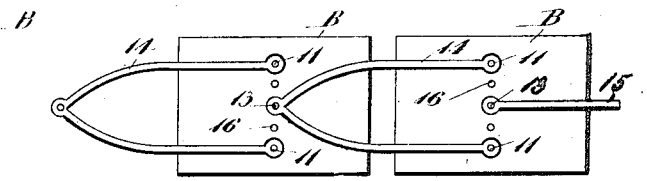
Figure 4:
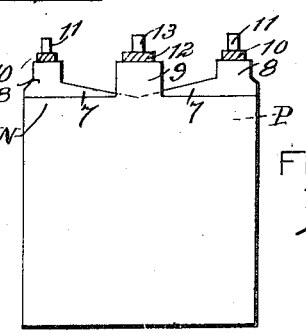

In the drawings, Figure 1 is a side elevation of a grid embodying my invention. Fig. 2 is a plan view of a secondary battery provided with such grids. Fig. 3 is a plan view of two such batteries having their poles electrically connected. Fig. 4 is a section taken on the line 4—4 of Fig. 2.

In the particular drawings selected for more fully disclosing my invention, 1 is a grid comprising as shown a rectangular frame of suitable material such as lead-antimony compound and having longitudinal ribs 2 and lateral ribs 3 of the usual well known construction for holding active material in place. 4, 4 represent lateral ribs of larger dimensions than the ribs 3 arranged as shown, so as practically to divide the grid in three equal parts. Cross-ribs 5, 5 extend diagonally upward from the lower corners of the frame and in the present instance terminate in the vicinity of the lower ends of the extra contacting ribs 6, 6 extending downwardly from the top of the grid. The upper corners of the grid are reinforced as shown at 7, 7 and such reinforcements terminate in the lugs 8, 8.

As will be obvious, the cross-ribs 5, 5 act as conductors and cause a higher current density in the upper portion of the grid, and to accommodate such increase of current, the extra ribs 6, 6 and reinforcing portions 7, 7 are provided. In practice, a one-lug grid employed with automobile self-starters shows little or no deterioration in the lower corners, but I have found in practice that my improved grid oxidizes at approximately the same rate in all parts thereof, even when a current output as high as two hundred amperes is required for a few seconds from a battery designed to give twenty-five amperes.

In Fig. 2, B represents the battery jar containing positive plates P and negative plates N. The negative plates are provided with central lugs connected together by the connecting bar 12 provided with a pillar 13 about midway between its ends. The pairs of lugs 8, 8, of the positive grids are connected, respectively, by the connecting bars 10, each of which is provided with centrally located pillars 11. The mode of connecting the several bars is shown in Fig. 3, in which 14, 14 represent forked conducting members having their ends bored to receive the pillars 11, 11, which are electrically connected through the bars 10, 10 with the positive grids, and the pillar 13 which is electrically connected with the negative grids through the bar 12. The pillar 13 of one of the terminal cells may be connected in circuit through the straight connector 15. By means of the forked connectors of the character shown, I eliminate all danger of short-circuiting the positive and negative plates through the pillars 11, 13, such short-circuiting being liable to occur if the pillars 11, 11 were cross-connected by an arch springing from one to the other over the pillar 13.

A battery of this type preferably is vented by means of vent holes 16 arranged as shown in line with the pillars 11, 13.

I claim:

1. A positive grid for a storage battery of the pasted-grid type, comprising a rectangular frame having a lug at each of the upper corners thereof, the parts at which the lugs are attached to the frame being enlarged or reinforced, longitudinal and transverse ribs for holding the active material, extra conducting ribs extending downwardly from such reinforced parts, and cross-ribs extending diagonally from the lower corners of the frame to points adjacent to the lower ends of said extra ribs.

2. A positive grid for a storage battery of the pasted-grid type having a lug at each of the upper corners thereof, means for holding the active material, conducting ribs extending downwardly from said lugs and cross-ribs extending diagonally from the lower corners of the frame and terminating in the vicinity of the lower ends of said conducting ribs.

3. A positive grid for a storage battery of the pasted-grid type, comprising ribs for holding the active material, extra conducting ribs extending downwardly, and cross-ribs extending diagonally from the lower corners of the grid to points adjacent to the lower ends of said extra ribs.

4. A positive grid for a storage battery of the pasted-grid type, comprising a frame having a lug at each of the upper corners thereof, ribs for holding the active material, extra conducting ribs extending downwardly from said lugs, and cross-ribs extending diagonally from the lower corners of the grid to points adjacent to the lower ends of said extra ribs.

5. A positive grid for a storage battery of the pasted-grid type, comprising a frame having a lug at each of the upper corners thereof, the parts at which the lugs are attached to the frame being enlarged or reinforced, ribs for holding the active material, extra conducting ribs extending downwardly from such reinforced parts, and cross-ribs extending diagonally from the lower corners of the frame to points adjacent to the lower end of said extra ribs.

In testimony whereof, I have hereunto subscribed my name this 3rd day of February 1913.

WALLACE A. PRINCE.

Witnesses:
GEO. K. WOODWORTH,
E. B. TOMLINSON.

Copies of this patent may be obtained for five cents each, by addressing the "Commissioner of Patents. Washington, D. C."